US006648014B1

(12) United States Patent

Takahashi et al.

(10) Patent No.: US 6,648,014 B1
(45) Date of Patent: Nov. 18, 2003

(54) FLUID CONTROL VALVE AND PLATE WITH FILTER

(75) Inventors: Tamami Takahashi, Tokyo (JP); Yoshihiro Mochizuki, Kanagawa (JP)

(73) Assignee: Ebara Corporation, Tokyo (JP)

( * ) Notice: Subject to any disclaimer, the term of this patent is extended or adjusted under 35 U.S.C. 154(b) by 2 days.

(21) Appl. No.: 10/069,789

(22) PCT Filed: Aug. 29, 2000

(86) PCT No.: PCT/JP00/05820

§ 371 (c)(1), (2), (4) Date: Feb. 28, 2002

(87) PCT Pub. No.: WO01/16514

PCT Pub. Date: Mar. 8, 2001

(30) Foreign Application Priority Data

Sep. 1, 1999 (JP) .......................................... 11-247972

(51) Int. Cl.[7] ........................ F15B 13/043; F16K 51/00; F16K 27/00

(52) U.S. Cl. ....................... 137/545; 137/549; 137/550; 137/625.62; 137/884

(58) Field of Search ................................ 137/545, 549, 137/550, 625.62, 884

(56) References Cited

U.S. PATENT DOCUMENTS 2,961,002 A 11/1960 Gordon
3,006,371 A * 10/1961 Giles .......................... 137/550
4,186,909 A * 2/1980 Patel .......................... 137/544
4,267,862 A 5/1981 Neff et al.
4,333,498 A 6/1982 Huling
5,697,401 A * 12/1997 Shinoda et al. ........ 137/625.62
5,722,456 A * 3/1998 Schumacher et al. ....... 137/550

FOREIGN PATENT DOCUMENTS

JP 2-102982 4/1990
JP 8-270820 10/1996

OTHER PUBLICATIONS

Microfilm of the specification and drawings annexed to the request of Japanese Utility Model Application No. 9603/1989 (Laid–open No. 101185/1990) (Mitsubishi Heavy Industries, Ltd.), Aug. 13, 1990.
Microfilm of the specification and drawings annexed to the request of Japanese Utility Model Application No. 56826/1989 (Laid–open No. 146262/1990) (Kabushiki Kaisha Ookane Seisakusho), Dec. 12, 1990.

* cited by examiner

*Primary Examiner*—Gerald A. Michalsky
(74) *Attorney, Agent, or Firm*—Wenderoth, Lind & Ponack, L.L.P.

(57) ABSTRACT

A hydraulic control valve has a valve block provided with a plurality of ports, a valve body formed with ports corresponding to the ports of the valve block, and a plate disposed between the valve block and the valve body. The plate has a flow passage for providing communication between the ports of the valve block and the ports of the valve body. A filter is disposed in the flow passage.

5 Claims, 7 Drawing Sheets

FLUID CONTROL VALVE AND PLATE WITH FILTER

BACKGROUND OF THE INVENTION

1. Technical Field

The present invention relates to a control valve for controlling a hydraulic pressure. More particularly, the present invention relates to a hydraulic control valve having a filter and also pertains to a plate with a filter for use in a hydraulic control valve.

2. Description of Related Art

FIG. 1 is a sectional view showing a structural example of a conventional hydraulic control valve of the type described above. The hydraulic control valve uses a pressurized working fluid as a control fluid for controlling an actuator such as a cylinder or a motor and also utilizes the pressurized fluid as a drive source for driving a spool. That is, a pressurized fluid led from a fluid supply port 201 in a valve block 200 to a supply port 102 in a valve body 101 of a hydraulic control valve 100 is utilized as a control fluid. At the same time, the pressurized fluid is branched inside the valve body 101 and led to nozzles 106 and 107 of a nozzle flapper mechanism 105 through orifices 103 and 104. Thus, the pressurized fluid is utilized as a pressure source for driving a spool 108.

The fluid flowing toward the nozzles 106 and 107 through the orifices 103 and 104 is once filtered through a filter 109 provided in the valve body 101. The fluid flowing toward the nozzles 106 and 107 passes through narrow gaps, i.e. the orifices 103 and 104 and the nozzles 106 and 107. Therefore, if the gaps are clogged with particles, the normal function of the hydraulic control valve is impaired. To avoid such a problem, the filter 109 is provided in the valve body 101.

SUMMARY OF THE INVENTION

Problem to be Solved by the Invention

The hydraulic control valve having a structure in which the filter 109 is incorporated in the valve body 101 as stated above needs to disassemble the hydraulic control valve 100 to replace the filter 109 when it is clogged with particles or maintenance is carried out, and thus requires a troublesome operation. During the replacement, the hydraulic control valve 100 does not function, and the system using it cannot operate. Therefore, the operating rate of the system is reduced undesirably.

To avoid the reduction in the operating rate of the system, it is conceivable that another hydraulic control valve 100 is prepared, and when the filter 109 is to be replaced, the existing hydraulic control valve is changed with the prepared one to operate the system. In this case, however, the system requires another hydraulic control valve 100. Because there are differences among individual hydraulic control valves, it may be necessary to make readjustment of the system operation and so forth.

There is a hydraulic control valve wherein the filter 109 is detachably provided in the valve body 101 to facilitate the replacement. This arrangement allows the maintenance time to be shortened and is effective in increasing the operating rate of the system. However, because the valve body 101 has a complicated flow passage formed therein, if a filter is further detachably provided in the valve body 101, the number of machining processes necessary for the valve body 101 increases, resulting in an increase in cost. In addition, when the filter 109 is replaced, care must be taken not to allow particles and the like attached to the filter 109 to enter the inside of the valve body 101.

The present invention was made in view of the above-described circumstances. An object of the present invention is to eliminate the above-described problems and to provide a hydraulic control valve designed so that filter replacement is facilitated and the filter replacing operation requires a shortened period of time, and also provide a plate with a filter for use in a hydraulic control valve.

Means for Solving the Problem

To solve the above-described problem, according to a first feature of the present invention, there is provided a hydraulic control valve having a valve block provided with a plurality of ports and a valve body formed with ports corresponding to the ports of the valve block, wherein a plate is provided between the valve block and the valve body. The plate is formed with a flow passage for providing communication between the ports of the valve block and the ports of the valve body. In addition, a filter is disposed in the flow passage.

According to a second feature of the present invention, the plate in the above-described hydraulic control valve is formed therein with a flow passage for branching a pressurized fluid from the valve block into a control fluid and a pilot fluid. In addition, the valve body is provided with a pilot port for introducing the pilot fluid from the plate, and the filter is provided in a pilot flow passage in the plate.

According to a third feature of the present invention, the valve body in the above-described hydraulic control valve has a hydrostatic bearing for supporting a spool, and the pressurized fluid from the pilot port is introduced into the hydrostatic bearing.

As stated above, a plate is provided between the valve block and the valve body, and a filter is provided in a flow passage in the plate that provides communication between the ports in the valve block and the ports in the valve body. With this arrangement, filter replacement and maintenance can be performed simply by replacing the plate. Thus, the replacing operation is easy and can be completed in a shortened period of time. Therefore, the period of time during which the hydraulic control valve is unavailable for operation can be reduced to a considerable extent. Accordingly, it is possible to increase the operating rate of a system using the hydraulic control valve.

In comparison to the conventional structure in which a filter is incorporated in the valve body, the flow passage in the valve body is simplified, and the valve body can be made compact in size. In addition, the production cost of the valve body can be reduced.

Further, because the system can be operated simply by preparing two low-cost plates with a filter instead of preparing two costly hydraulic control valves, the overall cost of the system can be reduced.

Further, when it is to be replaced or cleaned, the filter can be detached simply by removing the plate, which is independent of the valve body. Therefore, particles attached to the filter can be prevented from entering the inside of the hydraulic control valve.

Further, it is unnecessary to prepare another hydraulic control valve for the purpose of increasing the operating rate of a system using the hydraulic control valve. The operating rate can be increased simply by preparing a plate of simple arrangement that is equipped with a filter.

Further, it is possible to eliminate the influence on the control performance due to the difference among individual hydraulic control valves that would otherwise occur when the hydraulic control valve is replaced with another hydraulic control valve as in the conventional system.

According to a fourth feature of the present invention, another filter is provided in a control flow passage in the plate in the above-described hydraulic control valve, so that filters of different filtration accuracy are provided in the pilot flow passage and the control flow passage.

If different filters are provided in the control flow passage and the pilot flow passage in the plate as stated above, it is possible to independently filter the control fluid flowing through the control flow passage and the pilot fluid flowing through the pilot flow passage.

With the above-described arrangement, it becomes possible to perform not only filtering of the pilot fluid but also filtering of the control fluid. Therefore, the whole system can be improved in reliability. Further, because the pilot fluid and the control fluid can be filtered independently of each other, it is possible to select filters having filtering performance suitable for the pilot fluid and the control fluid.

According to a fifth feature of the present invention, there is provided a plate detachably installed between a valve block and a valve body in a hydraulic control valve, the valve block being provided with a plurality of ports, and the valve body being formed with ports corresponding to the ports of the valve block. The plate is formed with a flow passage for providing communication between the ports of the valve block and the ports of the valve body, and a filter is disposed in the flow passage.

As stated above, the plate installed between the valve block and the valve body is a plate with a filter, that is, a plate having a filter provided in a flow passage formed therein. Thus, a hydraulic control valve with a filter can be constructed simply by installing the plate between the valve block and the valve body.

EXPLANATION OF REFERENCE NUMERALS

10: valve block, 11: supply port, 12: control port, 13: control port, 20: plate, 21, 22, 23: flow passage, 24, 25: filter, 26: cap screw, 27: tapped hole, 28: plug, 29: filter, 30: valve body, 31: supply port, 32, 33: control port, 34, 35: pilot port, 36, 37: pilot flow passage, 38: sleeve, 39: spool, 40, 41: hydrostatic bearing, 42, 43: bearing orifice, 44, 45: orifice, 50: nozzle flapper mechanism, 51, 52: nozzle, 53: torque motor, 54: flapper, 60: displacement sensor, 62: O-ring.

DETAILED DESCRIPTION OF THE INVENTION

Figure 1:
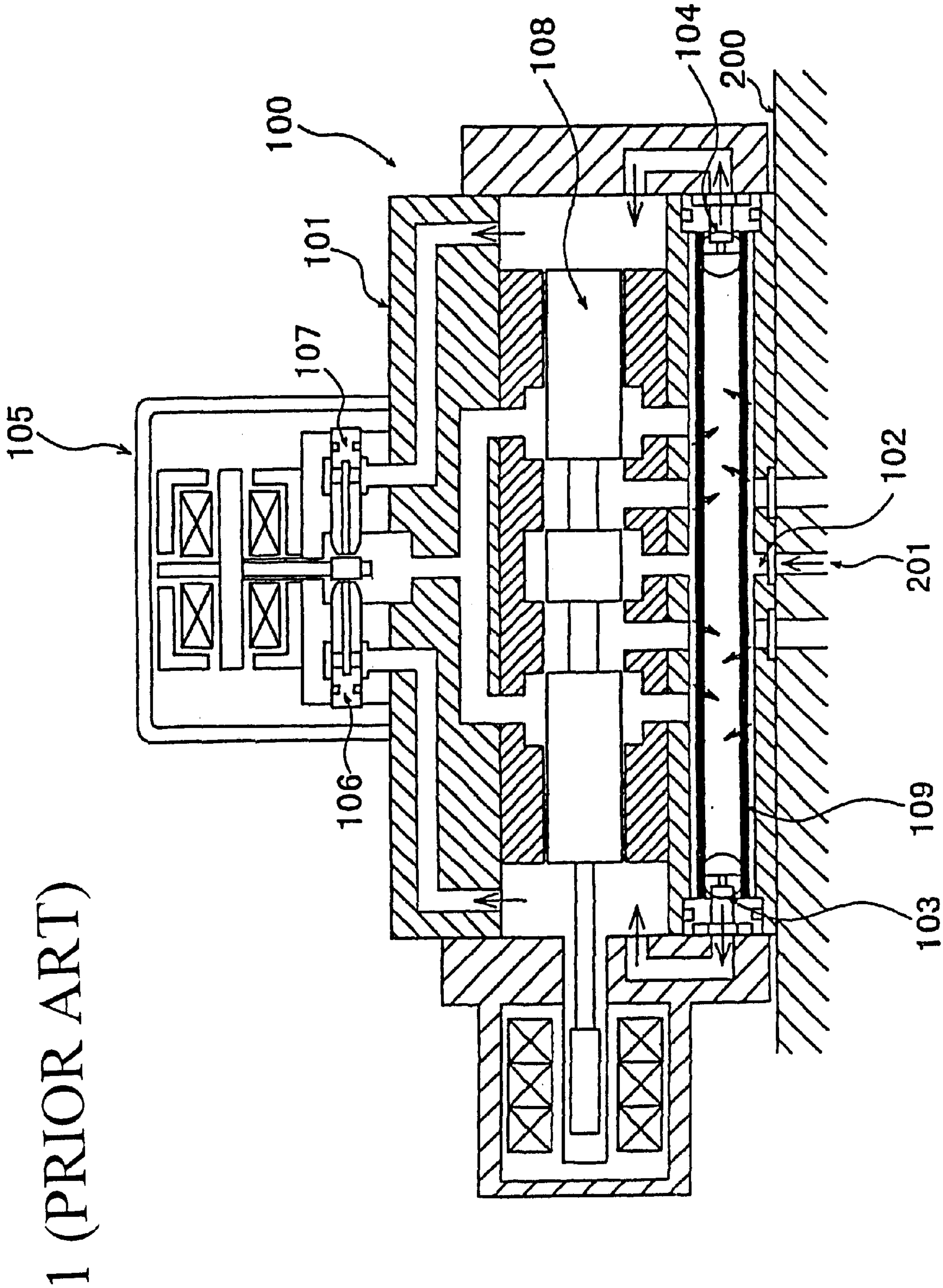
Fig. 1 (PRIOR ART)
FIG. 1 is a sectional view showing a structural example of a conventional hydraulic control valve.
Figure 2:
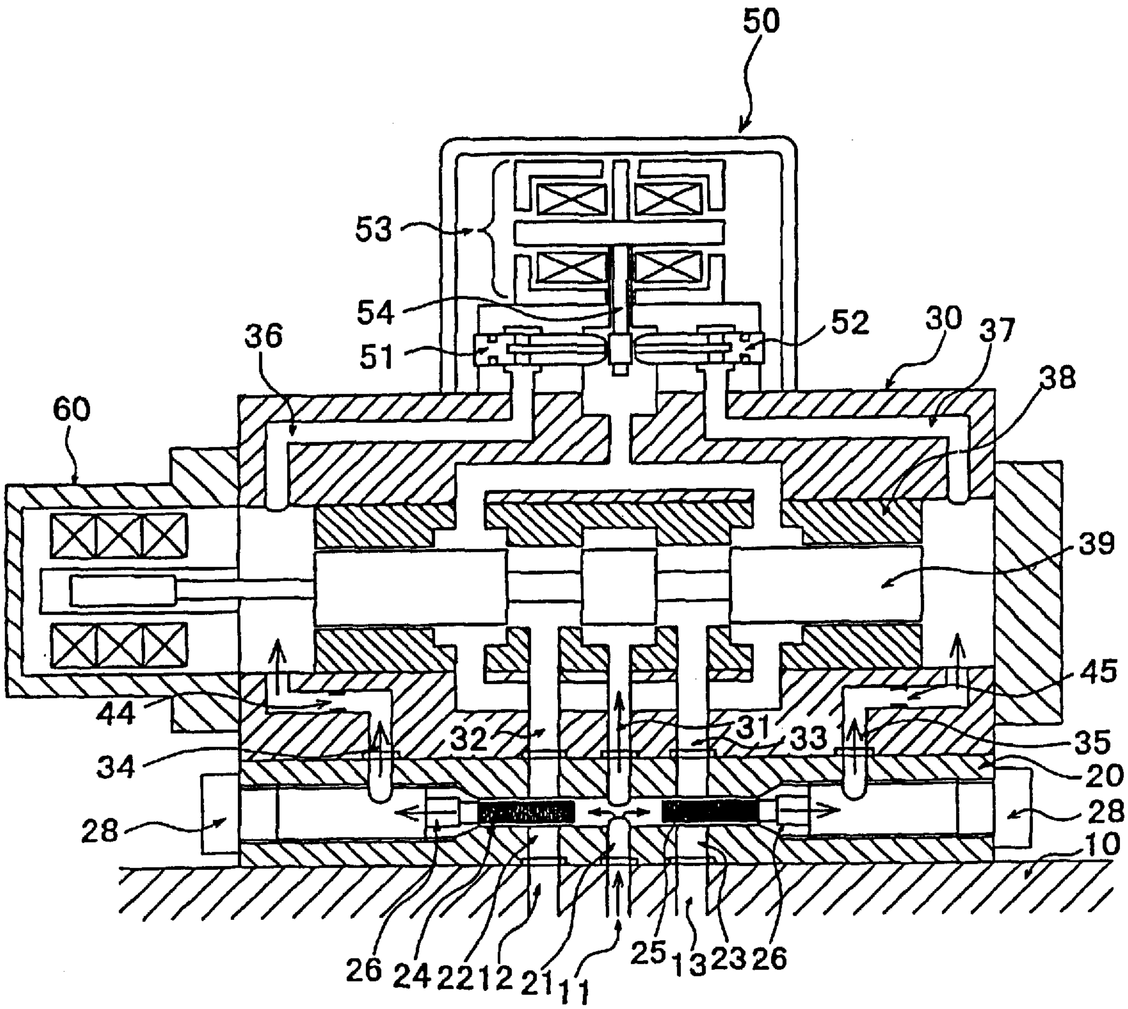
FIG. 2 is a sectional view showing a structural example of a hydraulic control valve according to the present invention.

Embodiments of the present invention will be described on the basis of the drawings. FIG. 2 is a sectional view showing a structural example of a hydraulic control valve according to the present invention. The hydraulic control valve has an arrangement in which a valve body 30 is mounted on a valve block 10 through a plate 20. A nozzle flapper mechanism 50 is installed on the top of the valve body 30. A displacement sensor 60 is installed on a side of the valve body 30.

The plate 20 is formed with flow passages 21, 22 and 23 allowing a supply port 11 and control ports 12 and 13 of the valve block 10 to communicate, respectively, with a supply port 31 and control ports 32 and 33 of the valve body 30. Of the three flow passages, the flow passage 21 is branched into three passages. One passage communicates with the supply port 31 of the valve body 30. The other two passages communicate with pilot ports 34 and 35 leading to the nozzle flapper mechanism 50. Cylindrical filters 24 and 25 are respectively disposed in the branch passages of the flow passage 21 that communicate with the pilot ports 34 and 35.

Figure 3:
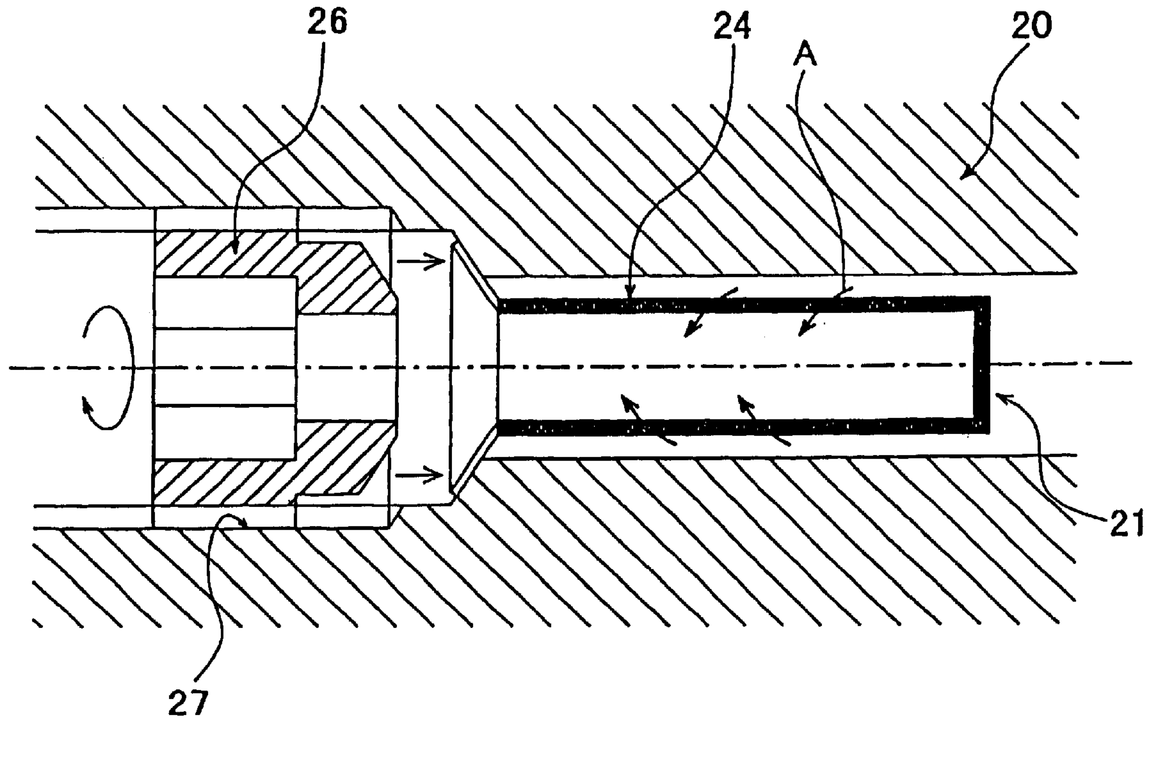
FIG. 3 is a sectional view illustrating a cylindrical filter of the hydraulic control valve according to the present invention and a method of installing the filter.

FIG. 3 is a sectional view illustrating the placement of the cylindrical filter 24 and a method of installing the cylindrical filter 24. Because the cylindrical filter 25 is similar to the cylindrical filter 24, a description thereof is omitted. The cylindrical filter 24 is secured to the plate 20 with a hollow cap screw 26 engaged with a tapped hole 27 formed in the plate 20. A pressurized fluid flowing into the flow passage 21. from the supply port 11 of the valve block 10 is filtered through the cylindrical filter 24 when flowing from the outer periphery to the inside of the filter 24 as shown by the arrows A. Thereafter, the pressurized fluid flows into the pilot port 34. In other words, the pilot ports 34 and 35 are supplied with the working fluid having particles filtered out through the filters 24 and 25.

The end of the tapped hole 27 is sealed with a plug 28. The filter 24 can be detached from the plate 20 by removing the plug 28 and the cap screw 26. Therefore, replacement and cleaning of the filters 24 and 25 can be readily performed.

Figure 7:
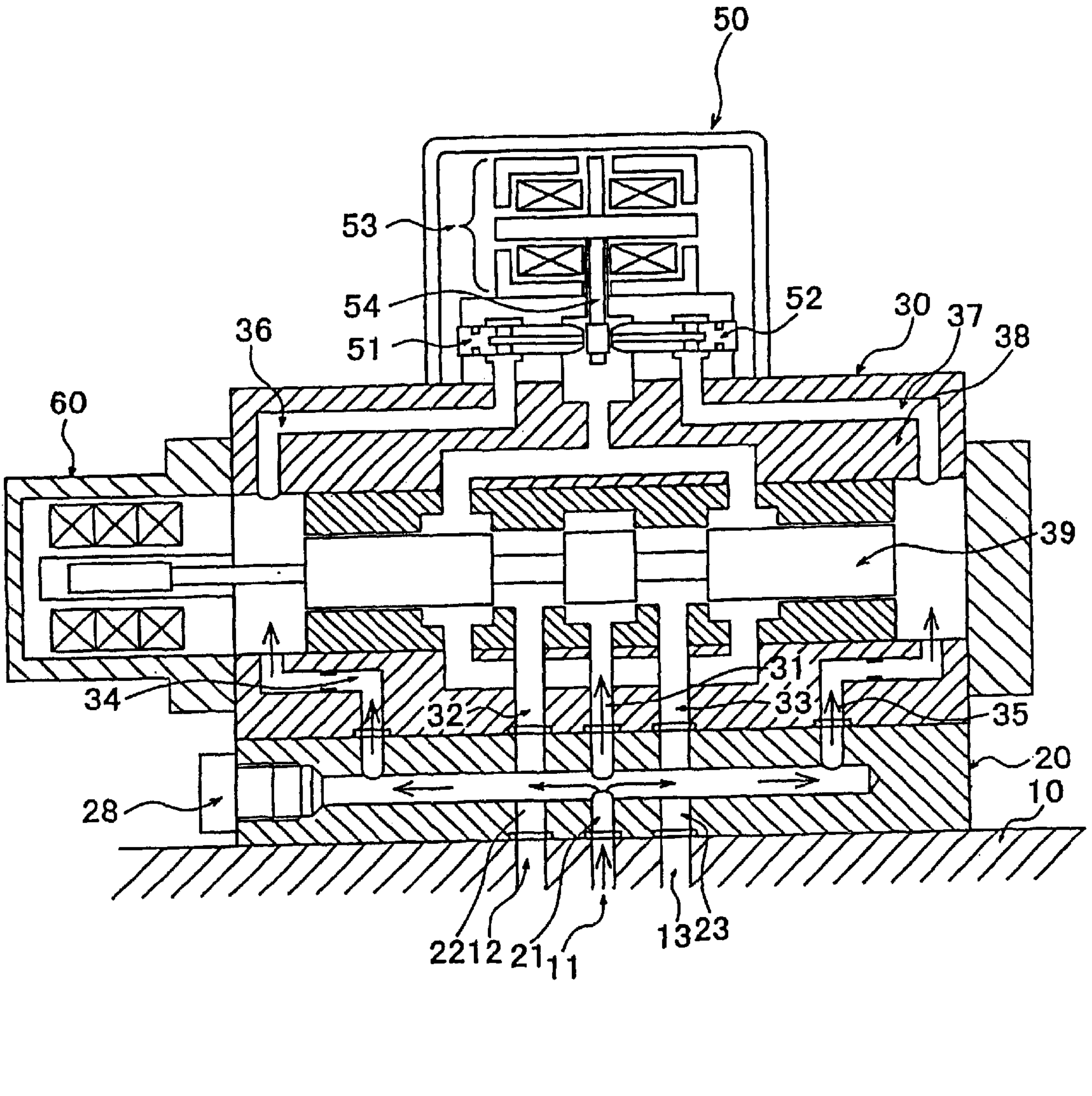
FIG. 7 is a sectional view showing a structural example of the hydraulic control valve in which a plate without a filter is used.

When the filters 24 and 25 are to be replaced or cleaned, the plate 20 is replaced with another plate 20 equipped with new filters 24 and 25, whereby the hydraulic valve can be operated immediately. Alternatively, the plate 20 may be replaced with a plate 20 formed with a branched flow passage but not equipped with a filter as shown in FIG. 7. In this case also, the hydraulic valve can be operated immediately.

The flow rate of the fluid flowing through pilot flow passages 36 and 37 to nozzles 51 and 52 of the nozzle flapper mechanism 50 is not high, but the fluid flows constantly. Therefore, it is desirable that the filters 24 and 25 have a small mesh size on the order of several microns and a large filtration area. Therefore, a cylindrical filter is selected as each of the filters 24 and 25. The cylindrical filter has a filtration area over the whole surface of the cylinder and hence provides a large filtration area despite its compact structure. The cylindrical filters 24 and 25 are provided in tunnel-shaped pilot flow passages branching off from the flow passage 21 communicating with the supply port 11. Thus, the plate 20 can be reduced in thickness by effectively utilizing the tunnel-shaped pilot flow passages.

Next, the operation of the hydraulic control valve arranged as stated above will be described. A spool 39 is slidably disposed in a sleeve 38 with a predetermined clearance. The nozzle flapper mechanism 50 comprises nozzles 51 and 52, a torque motor 53, and a flapper 54. The displacement sensor 60 has an amplifier including a feedback circuit, an amplifier circuit, etc. (not shown) to detect the position of the spool 39 and to perform electric feedback control for the positioning of the spool 39.

When the spool 39 is displaced, flow passages formed by the above-described components are switched from one to another. Consequently, the supply port 31 communicates with either of the control ports 32 and 33. At the same time, the other control port and a tank port (not shown) communicate with each other. The opening area of each flow passage is adjusted by the position of the spool 39, thereby controlling the flow rate of fluid flowing through the flow passage and the pressure applied to the control ports 32 and 33. An actuator such as a cylinder or a motor is connected between the control port 32 and the control port 33, and the pressurized fluid is supplied to and discharged from the actuator, thereby controlling the operation of the actuator. It is also possible to control force generated from the actuator by controlling the differential pressure between the two ports.

The pressurized fluid supplied to the pilot ports 34 and 35 flows into spaces at both ends of the spool 39 through orifices 44 and 45. Further, the pressurized fluid is led to the nozzles 51 and 52 through the pilot flow passages 36 and 37 and blows off from the nozzles 51 and 52. At this time, the distance between the distal end of each of the nozzles 51 and 52 and the surface of the flapper 54 facing opposite to the nozzle distal end is varied by the torque motor 53 to give resistance to the flow of fluid blowing off from the nozzles 51 and 52, thereby producing a pressure difference between the upstream sides of the nozzles 51 and 52, i.e. between the chambers at both ends of the spool 39. The spool 39 is driven by this differential pressure.

Figure 4:
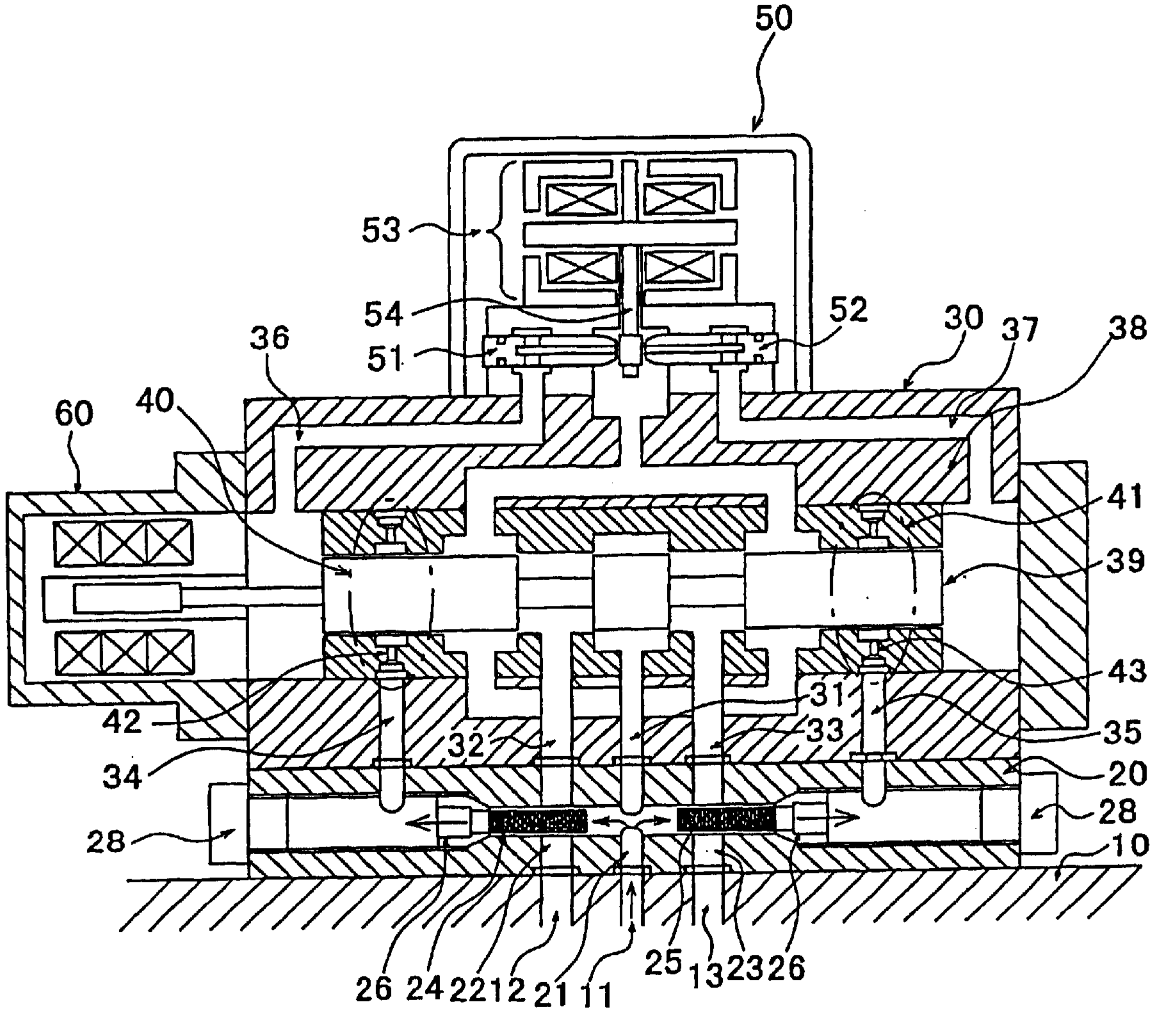
FIG. 4 is a sectional view showing a structural example of the hydraulic control valve according to the present invention.

FIG. 4 is a sectional view showing another structural example of the hydraulic control valve according to the present invention. This hydraulic control valve has hydrostatic bearings 40 and 41 at both ends of a spool 39. In this hydraulic control valve also, a valve body 30 is attached to a valve block 10 through a plate 20 in the same way as in the hydraulic control valve shown in FIG. 2. Flow passages formed in the plate 20 are also the same as those of the hydraulic control valve shown in FIG. 2. Flow passages branching off from a flow passage 21 communicating with the supply port 11 communicate with pilot ports 34 and 35 of the valve body 30 through filters 24 and 25, respectively, in the same way as in the hydraulic control valve shown in FIG. 2. The hydraulic control valve shown in FIG. 4 differs from the hydraulic control valve shown in FIG. 2 in that the pilot ports 34 and 35 communicate with the hydrostatic bearings 40 and 41 through flow passages provided in the valve body 30.

The pressurized fluid supplied to the hydrostatic bearings 40 and 41 flows through bearing orifices 42 and 43 in the hydrostatic bearings 40 and 41 and through the gap between the spool 39 and the, sleeve 38. Therefore, if particles are present in the fluid, the bearing orifices 42 and 43 may be clogged with the particles. If particles are caught in the gap between the spool 39 and the sleeve 38, the spool 39 cannot operate smoothly. Accordingly, the working fluid is filtered through the filters 24 and 25 provided in the plate 20, thereby preventing the occurrence of problems such as those stated above.

The action and effect obtained by providing the filters 24 and 25 in the plate 20, which is independent of the valve body 30, are the same as in the case of the hydraulic control valve shown in FIG. 2.

Figure 5:
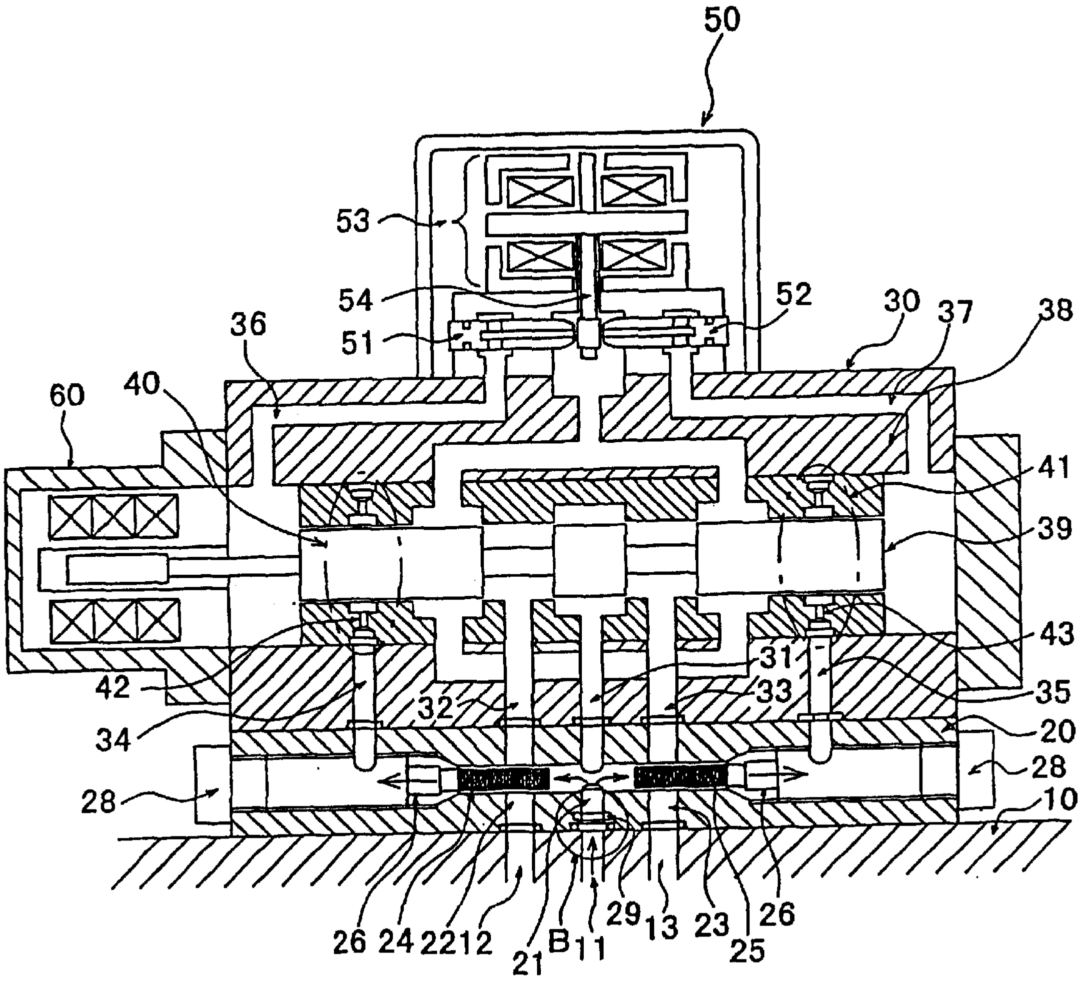
FIG. 5 is a sectional view showing a structural example of the hydraulic control valve according to the present invention.
Figure 6:
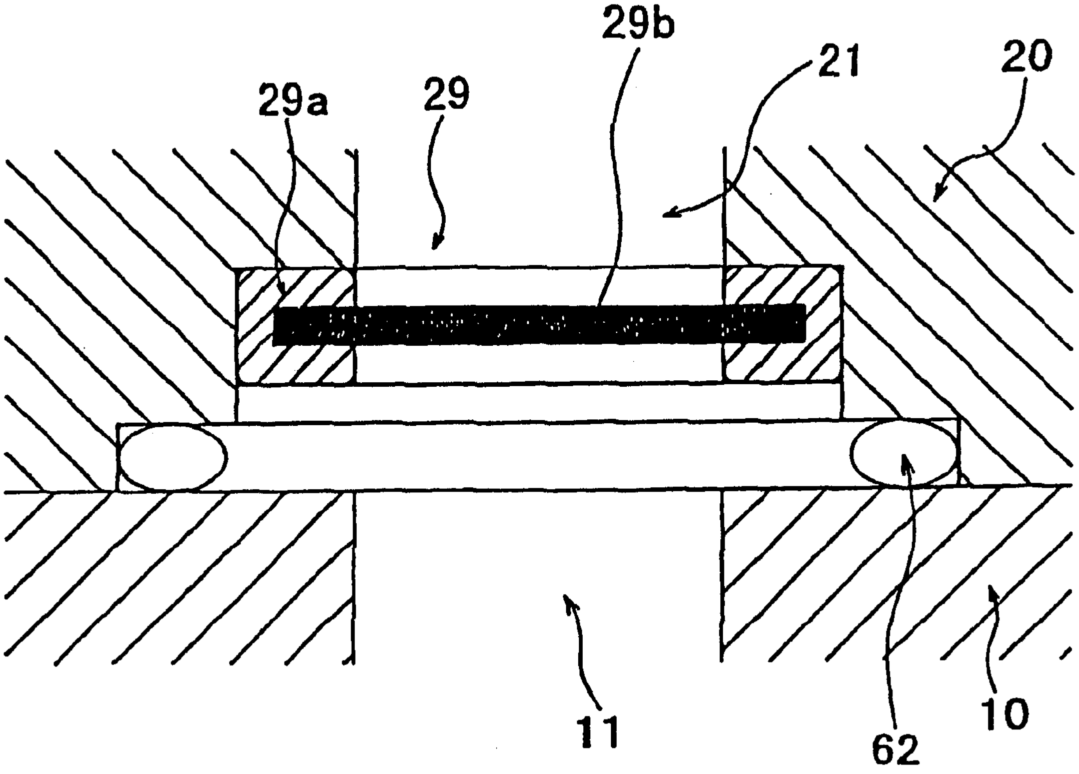
FIG. 6 is an enlarged sectional view of a part of the hydraulic control valve according to the present invention in which a disk-shaped filter is secured to a plate.

FIG. 5 is a sectional view showing another structural example of the hydraulic control valve according to the present invention. This hydraulic control valve has a disk-shaped filter 29 (an enlarged view thereof is shown in FIG. 6) in the inlet of the flow passage 21 communicating with the supply port 11 of the plate 20. Further, filters 24 and 25 are provided in two pilot flow passages of the flow passages branching off from each other at the downstream side of the filter 29. The disk-shaped filter 29 filters the fluid flowing into both the control flow passage and the pilot flow passage.

FIG. 6 is an enlarged sectional view of a part where the disk-shaped filter 29 is secured to the plate 20 (i.e. an enlarged view of part B in FIG. 5). The filter 29 comprises a ring-shaped base **29*a* and a metal mesh 29*b* secured to the base 29*a* by caulking. The filter 29 is secured by being fitted into a recess provided at the inlet of the flow passage 21 in the plate 20. As the filter 29, a mesh having a small pressure loss is selected according to the control flow rate of the hydraulic control valve. In general, the control flow rate is higher than the pilot flow rate. Therefore, a mesh coarser in mesh (filtration accuracy) than the downstream filters 24 and 25, e.g. a mesh size on the order of several 100 microns, should be selected. Reference numeral 62 denotes an O-ring interposed between the valve block 10 and the plate 20**.

As stated above, the disk-shaped filter 29 of coarse mesh is provided upstream from a point where the fluid from the supply port 11 is branched into the control fluid and the pilot fluid. Consequently, even if relatively large particles are mixed in the fluid, these particles can be removed. If particles that are so large as to get caught in the filter 29 are attached to the pilot-side filters 24 and 25, the pilot-side filtration area is reduced, and the flow resistance increases. This may cause the valve function to be impaired. Therefore, the disk-shaped filter 29 provided in the pre-stage performs the function of preventing large particles from flowing into the control flow passage and the function of allowing the downstream filters in the pilot flow passages to stand prolonged use.

It should be noted that the hydraulic control valve shown in FIG. 5 has filters provided in both the control and pilot flow passages. In this regard, a disk-shaped filter may be provided in the inlet of the flow passage 21 communicating with the supply port 11 formed in the plate 20 of the hydraulic control valve having the hydrostatic bearings 40 and 41 as shown in FIG. 4.

EFFECT OF THE INVENTION

As has been described above, the invention set forth in each claim provides advantageous effects as follows.

As stated above, a plate is provided between the valve block and the valve body, and a filter is provided in a flow passage in the plate that provides communication between the ports in the valve block and the ports in the valve body. With this arrangement, filter replacement and maintenance can be performed simply by replacing the plate. Thus, the replacing operation is easy and can be completed in a shortened period of time. Therefore, the period of time during which the hydraulic control valve is unavailable for operation can be reduced to a considerable extent. Accordingly, it is possible to increase the operating rate of a system using the hydraulic control valve.

In comparison to the conventional structure in which a filter is incorporated in the valve body, the flow passage in the valve body is simplified, and the valve body can be made compact in size. In addition, the production cost of the valve body can be reduced.

Further, when it is to be replaced or cleaned, the filter can be detached simply by removing the plate, which is independent of the valve body. Therefore, particles attached to the filter can be prevented from entering the inside of the hydraulic control valve.

Further, it is unnecessary to prepare another hydraulic control valve for the purpose of increasing the operating rate of a system using the hydraulic control valve. The operating rate can be increased simply by preparing a plate of simple arrangement that is equipped with a filter. In addition, the overall cost of the system can be reduced.

Further, it is possible to eliminate the influence on the control performance due to the difference among individual hydraulic control valves that would otherwise occur when the hydraulic control valve is replaced with another hydraulic control valve as in the conventional system.

According to the fourth feature of the present invention, different filters are respectively provided in the control flow passage and the pilot flow passage in the plate. Thus, it is possible to independently filter the control fluid flowing through the control flow passage and the pilot fluid flowing through the pilot flow passage, in addition to the above-described effects.

According to the fifth feature of the present invention, the plate installed between the valve block and the valve body is a plate with a filter, that is, a plate having a filter provided in a flow passage formed therein, and this plate is installed between the valve block and the valve body. Accordingly, it is possible to construct a hydraulic control valve having the above-described advantageous effects.

What is claimed is:

1. A hydraulic control valve having a valve block provided with a plurality of ports and a valve body formed with ports corresponding to the ports of the valve block, wherein a plate is provided between the valve block and the valve body, said plate being formed with a flow passage for providing communication between the ports of the valve block and the ports of the valve body, and wherein a branched flow passage is formed in said plate to branch a pressurized fluid from said valve block passing through said flow passage into a control fluid and a pilot fluid, said valve body being provided with a pilot port for introducing the pilot fluid passing through said branched flow passage, and a filter is provided in said branched flow passage.

2. A hydraulic control valve according to claim 1, wherein said filter is secured to the plate with a hollow cap screw engaged with a tapped hole formed in said plate, and an end of said tapped hole is sealed with a plug, so that said filter can be detached from the plate by removing said plug and said cap screw.

3. A hydraulic control valve according to claim 1, wherein said valve body has a hydrostatic bearing for supporting a spool, and the pressurized fluid from said pilot port is introduced into said hydrostatic bearing.

4. A hydraulic control valve according to claim 1, wherein another filter is provided in a flow passage in said plate, said another filter having a filtration accuracy different from that of the filter provided in said branched flow passage.

5. A plate detachably installed between a valve block provided with a plurality of ports and a valve body formed with ports corresponding to the ports of said valve block, said plate comprising:

a flow passage for providing communication between the ports of said valve block and the ports of said valve body;

a branched flow, passage for branching a pressurized fluid from said valve block passing through said flow passage into a control fluid and a pilot fluid;

a pilot port provided in said valve body to introduce the pilot fluid passing through said branched flow passage; and a filter disposed in said branched flow passage.

* * * * *